Patented Mar. 31, 1953

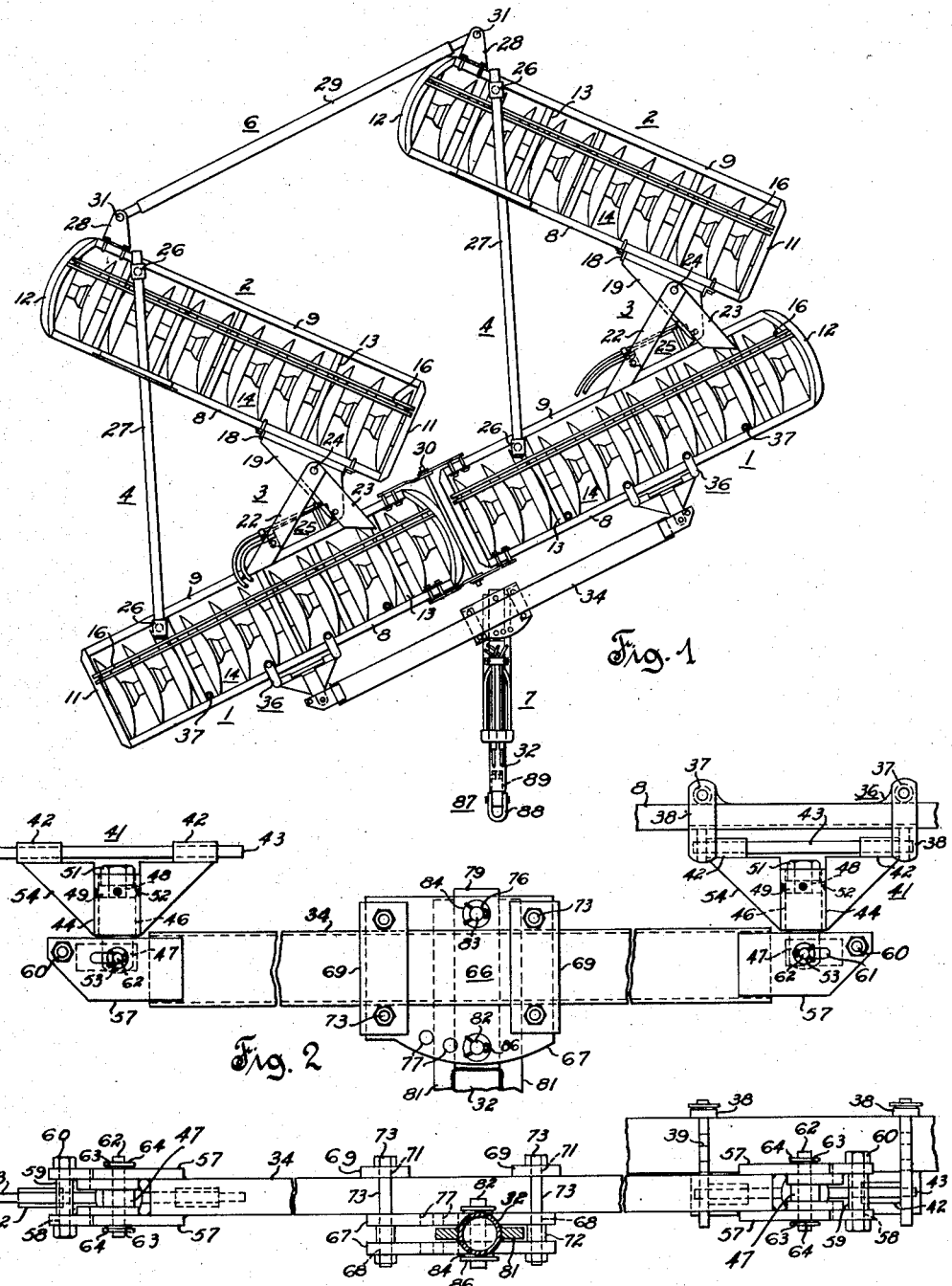

2,632,987

UNITED STATES PATENT OFFICE 2,632,987

HARROW SQUADRON HITCH

Kenneth E. Jones, Oxnard, Calif., assignor to Allis-Chalmers Manufacturing Company, Milwaukee, Wis., a corporation of Delaware Application October 27, 1947, Serial No. 782,267

10 Claims. (Cl. 55—83)

This invention relates to tandem disc harrows of the type employing a squadron hitch wherein a plurality of harrow units, each comprising a front and rear gang, are operatively coupled together and adapted for connection with a suitable propelling vehicle for controlling relative movement into and out of gang-angled position. More particularly this invention is directed toward an improved hitch means for a squadron disc harrow.

It is an object of this invention to provide an improved harrow construction including a novel hitch means affording a large amount of relative movement between the harrow units and also between the harrow and the propelling vehicle.

Another object of this invention is to provide a squadron hitch construction affording a simple means for readily shifting the squadron laterally with respect to the line of draft through a wide range of offset trailing positions.

It is also an object of this invention to provide an improved construction whereby each harrow unit may be free to move in a vertical plane to follow either humps or hollows in the ground contour and still maintain a substantially uniform draft pull on each unit to insure a more equal distribution of work among the gangs.

A still further object of this invention is to provide means whereby the various harrow units, while free to move vertically with respect to one another, will be maintained in predetermined laterally spaced relation with respect to one another.

The above mentioned and additional objects and advantages afforded by this invention will become more apparent as the disclosure progresses. Although described as applied to a squadron disc harrow it will be seen that the invention has a more general application. The present invention may be considered as comprising those features of construction and/or combinations and subcombinations of various elements as more particularly set forth in the appended claims and in the detailed description reference being had to the accompanying drawings illustrating one embodiment of the invention, and in which:

Fig. 1 is a plan view of a squadron arranged (two unit) tandem disc harrow with the rear gangs in angled, operating position, and portions of the hydraulic conduit omitted for sake of clarity;

Fig. 2 is an enlarged plan view of the draft assembly, the head block having been omitted from the connection with the evener bar as shown at the left, and the forward portion of the draft pole having been cut away; and Fig. 3 is a front elevation of parts shown in Fig. 2.

Referring to Fig. 1 it will be seen that the illustrated embodiment of this invention includes a two unit tandem disc harrow, each unit consisting of a front gang 1 and a rear gang 2, a center hinge structure 3 operatively connecting the front and rear gang of each unit for relative swinging movement about a vertical pivot axis, a chatter bar 4 operatively connecting similarly located points on the front and rear gang frames remote from the hinge connection therebetween, a tie bar 6 operatively connecting the rear gangs for movement in unison, and a draft structure 7. The front and rear gangs are generally similar and each includes a rigid frame structure comprising generally parallel front and rear side members 8 and 9, respectively, interconnected by a straight end member 11, by a curved end member 12, and by a plurality of intermediate bracing members 13. Each frame rotatably mounts similar disc gangs 14 through a conventional mounting structure, a detailed description thereof being deemed unnecessary for a complete understanding of the present invention. Each frame also includes a disc scraper supporting bar structure 16 adapted to adjustably mount scraper elements (not shown) thereon for coaction with the concave sides of the discs. It will be noted that the front and rear gangs, while similar in construction, are reversed in position with the concave side of the discs of the front and rear gangs, respectively, facing in generally opposite directions.

The center hinge structure 3 includes a bracket 18 adjustably secured to side frame member 8 of the rear gang having a pair of vertically spaced generally parallel arms 19 projecting outwardly therefrom and presenting free end portions remote from the bracket proper, and a bracket fixed to side frame member 9 of the front gang, the latter comprising a pair of vertically spaced, generally parallel, rearwardly extending arms 22 and another pair of similarly arranged arms 23, the pairs of arms 22 and 23 converge rearwardly and terminate with their rear ends disposed in crossed side abutting relation, these crossed ends being rigidly united by welding or other suitable means. The crossed rigidly united end portions of arms 22 and 23 have vertically aligned holes therethrough and these end portions are hingedly connected with an intermediate portion of arms 19 of bracket 18 by means of a pin or the like 24 extending through said holes and similarly disposed holes in arms 19. This connection affords a vertical pivot axis about which the front and rear gangs may swing relative to each other. A suitable means, such as the hydraulically actuated cylinder and piston unit 25, is carried by the front gang frame and coacts with the free end portion of arm 19 to move the front and rear gangs relative to each other about the vertical pivot axis afforded by pin 24. A more detailed description of this construction is deemed unnecessary, since it is not a part of this invention, and the brief description given above is believed sufficient in this case.

Chatter bar 4, which operatively connects each front and rear gang, comprises a pivot connector 26 located on the front gang frame at a point remote from the center hinge, a rod 27 extending rearwardly from this connector in overlying relation with respect to the rear gang frame, and another pivot connector similarly located on the rear gang and slidably receiving the rear end portion of rod 27.

The rear side frame member 9 of each rear gang is provided with a bracket 28 extending rearwardly therefrom and presenting a free end portion having an opening therein. A bar member 29 extends between these brackets and is operatively connected therewith by means of a pin 31 inserted through the openings in bracket 28 and a slottted end portion of the bar (not shown). This tie bar structure tends to keep the rear gangs "in step" while moving into and out of working position.

The rigid frame structures of the front gangs 1 are hingedly connected together at their relatively adjacent ends by means of a hinge pin 30. This pin forms a pivot axis for up and down swinging movement of the front gangs 1 relative to each other.

Draft structure 7 includes generally a single draft pole 32 operatively connected to an "evener" bar 34 affording adjustable flexible connections with the front gang frames. More particularly (note Figs. 2 and 3) a head block 36 is secured to each side frame member 8 of the two forward gangs for adjustment therealong through means of laterally spaced pin receiving projections 37 on the rear side thereof. Each head block is provided with laterally spaced, forwardly projecting, rigid, parallel portions 38 having pairs of vertically spaced, horizontally aligned openings 39 therethrough generally parallel to side member 8. A connecting plate or coupling structure 41 is secured to each head block by means of a pair of laterally spaced, aligned pin receiving projections 42 adapted to be received between head block portions 38 and aligned with any selected one of the pairs of vertically spaced openings 39 therein. A pin 43 extends through these aligned openings and projections thereby providing a horizontal pivot axis for plate structure 41 generally parallel to the axis of rotation of the front disc gangs. In detail, each plate structure 41 comprises a tubular bearing member 44 containing a cylindrical shaped member 46 having a diameter slightly less than the inside diameter of tube 44 and having a reduced cylindrical rear portion 48. Cylindrical member 46 is rotatable in tubular bearing member 44 and is retained against longitudinal movement forwardly thereof by means of an annular ring 49 surrounding reduced portion 48 and held thereon by means of a nut 51, ring 49 being fixed to member 44 by depositing weld metal in a series of circumferentially spaced apertures 52 therethrough exposing outer peripheral portions of the ring. The opposite end of member 46 presents a flattened portion 47 extending outwardly from tubular member 44 and having an aperture 53 therein for receiving a pin or like connector. Triangular shaped plate-like bracing members 54 are fixedly secured, preferably by welding, in edge-abutting relation to diametrically opposed portions of tubular member 44. Rear edge portions of these plate-like members are provided with the aforementioned hinge pin receiving projections 42, these projections being disposed at right angles with respect to the longitudinal axis of tube 44 and laterally spaced therefrom. It can be seen from the foregoing description that the plate structure 41 may swing vertically with respect to the front gang frame, and also, the projecting part 47 may rotate about the longitudinal axis of cylinder 46.

An evener bar 34 has its opposite ends connected with the plate structure 41 on each head block 36 and is thereby carried by these blocks in generally parallel relation to the axis of rotation of the front gang frame. Each end of this bar is provided with a pair of vertically spaced generally parallel plates fixed thereto, as by welding or otherwise, and presenting free end portions having vertically aligned openings 58 therethrough. An apertured spaced part 59 is disposed between the free end portions of each pair of plates and is secured therebetween by a bolt 60 which extends through said openings and spacer part. The plates 57, intermediate the end portions thereof welded to bar 34 and the openings 58, are provided with vertically aligned pin receiving slots 61, and the flattened portion 47 of each head block connecting means is positioned between plates 57 with the aperture 53 aligned vertically with slots 61. A pin 62 extends through these slots and aperture and is secured against axial movement by washer 63 and cotter pin 64 disposed at each end thereof. The slot and pin connection just described permits the head blocks on the two front frames to, in effect, move laterally with respect to each other as the respective gangs undulate over the ground.

A pole supporting structure 66 is mounted on evener bar 34 for adjustment therealong, this structure comprising a pair of generally parallel vertically spaced plate-like members 67 disposed beneath the bar and provided with a pair of vertically aligned holes 68 at each corner thereof, and a pair of laterally spaced strap members 69 disposed on top of the bar having openings 71 therethrough aligned with the holes 68 in plate 67. The plate-like members 67 are maintained in a vertically spaced relation beneath bar 34 by suitable means such as tubular spacer parts 72 disposed therebetween and in alignment with the holes 68, straps 69 and plates 67 being detachably secured to bar 34 by bolts 73 which extend through aligned openings 68, 71 and spacers 72.

Plate members 67 are provided with an additional pair of vertically aligned openings 76 adjacent the rear portion thereof and with a series of laterally spaced pairs of vertically aligned holes 77 adjacent the forward end thereof, these holes at the forward end being disposed on an arc having as a center the vertically aligned openings 76 in the rear portion of the structure. A single tubular draft pole 32 is provided with a flattened, plate-like, rearwardly extending portion which may be formed integrally with the pole or may be separately formed and attached to the rear end portion of the pole as by welding. In the illustrated construction, this flattened rear end portion comprises a central part 79 having a thickness substantially equal to the spacing between plates 67, and marginal reinforcing side flanges 81 which extend alongside the pole proper in parallel edge abutting relation thereto, these flanges being formed either integrally with or welded to the central portion and the entire structure including plate 79 and flanges 81 being welded or otherwise suitably secured to the pole. In attaching draft pole 32 to the pole plate supporting structure 66, the rearwardly extending central portion 79 is disposed between plate 67 and is provided with a pair of longitudinally spaced apertures of which one aperture is arranged for alignment with a pair of vertically spaced holes 76 adjacent the rear portion of structure 66 and of which the other aperture is arranged for alignment with one of the pairs of vertically spaced holes 77 at the front of the structure. Detachable pins 82 and 83 are then placed through the aligned series of holes in the front and rear portion, respectively, and are held in place by means of washers 84 and cotter pins 86 disposed on the opposite ends of the pins. The forward end of the pole is provided with a drawbar connector 87 (see Fig. 1) comprising a clevis 88 fixed to a tubular bearing portion 89 rotatably disposed in the forward end of the pole and retained against longitudinal movement therein by a suitable means, preferably one similar to that described above for retaining cylinder 46 in tubular bearing member 44 of the head block connecting means. A more detailed description of this construction is deemed unnecessary for a complete understanding of this invention.

It should now be apparent from the foregoing description that a squadron hitch harrow constructed in accordance with this invention affords relative vertical movement of the individual units as they move over the contours in the ground without disturbing the draft pull either as to the equal distribution of draft force to the individual units or as to the position of the line of draft. In this connection it will also be noted that the line of draft can be adjusted vertically by shifting the pin connection with the head block in the vertically spaced series of openings 39 and the line of draft can be adjusted laterally with respect to the center of the harrow by shifting the head blocks along the front gang frames and also by moving the pole supporting structure along the evener bar. And in order to correct the line of draft for a lateral shifting of the evener bar along the front gang frames the draft pole may be angularly shifted in its supporting structure about the pivot axis afforded by pin 82, the pole being selectively repositioned by changing the position of pin 83 to another one of the series of holes 77 in the forward portion of the structure.

Although the particular embodiment of this invention is described as applied to a two-unit squadron hitch disc harrow, it should be understood that it is not intended to thereby limit the invention. From the above description it will be readily apparent that the invention might similarly be applicable to a harrow having more than two units, and also, it might be applied to any other trailing implement in which it is desirable to have a hitch affording a highly flexible connection between a draft device and a plurality of units laterally aligned in relation with the line of draft.

It is claimed and desired to secure by Letters Patent:

1. In a disc harrow, a plurality of rigid frame structures having disc gangs rotatably mounted thereon, said frames being arranged in end opposed relation with one another and being hingedly connected to permit relative vertical movement about a horizontal axis generally normal to the axis of rotation of said disk gangs, a draft means comprising a head block adjustably positioned on the forward portion of each of said frames, a bar member disposed in generally parallel relation with the axis of rotation of said disc gangs and having a means connecting said bar with each of said head blocks, said connecting means including as parts thereof a hinge means for permitting relative vertical movement between said bar and said frame about a horizontal axis generally parallel to the axis of rotation of said disc gangs and a swivel permitting vertical rotation of said frame about a horizontal axis generally normal to the axis of rotation of said disc gangs, a bracket mounted on said bar, and a single draft pole carried by said bracket and extending forwardly therefrom.

2. In a disc harrow, a plurality of rigid frame structures having disc gangs rotatably mounted thereon, said frames being arranged in end opposed relation with one another and being hingedly connected to permit relative vertical movement about a horizontal axis generally normal to the axis of rotation of said disk gangs, a draft means comprising a head block adjustably positioned on the forward portion of each said frames, means hingedly connected with said head block in any of several vertically spaced positions afforded thereby for relative movement about a horizontal hinge axis generally parallel to the axis of rotation of said disc gangs, said last mentioned means also including a forwardly projecting part mounted in a manner affording swivel-like movement of said projecting part about a horizontal axis generally normal to said horizontal hinge axis, a bar member operatively connected to each of said projecting parts, a bracket adjustably positioned on said bar, and a single draft pole carried by said bracket and extending forwardly therefrom, said pole being adjustably mounted on said bracket for selectively varying the horizontal angle between said bar member and the longitudinal axis of the pole.

3. In a disc harrow including pairs of front and rear frames disposed in squadron relation and having disc gangs rotatably mounted thereon, a hinge means between opposed end portions of said front frames permitting relative vertical movement of said front frames about an axis generally normal to the axis of rotation of said front disc gangs, a head block adjustably positioned along the forward end of each of said front frames, connecting means hingedly united with said head block for relative movement about a horizontal axis generally parallel to the axis of rotation of said disc gangs, a bar structure disposed generally parallel with respect to said front gangs and having slotted portions at either end for connection with forwardly extending portions of said connecting means, a bracket adjustably positioned on said bar, and a single draft pole carried by said bracket and extending forwardly therefrom, said pole being adjustably mounted on said bracket for selectively varying the horizontal angle between said bar structure and the longitudinal axis of said pole.

4. In a disc harrow including pairs of front and rear frames disposed in squadron relation and having disc gangs rotatably mounted thereon, a hinge means between opposed end portions of said front frames permitting relative vertical movement of said front frames about an axis generally normal to the axis of rotation of said front disc gangs, a head block adjustably positioned along the forward end of each of said front frames, a bar structure supported at either end by one of said head blocks and having a swivel-like connection therewith, a bracket mounted on said bar structure, and a draft pole carried by said bracket and extending forwardly therefrom.

5. In a disc harrow having a plurality of front and rear disc gangs arranged in squadron relation and means connecting each front and rear gang for relative movement thereof about a vertical pivot axis, the combination of means connecting opposed end portions of said front gangs, a bracket structure on the forward portion of each of said front gangs, connecting means uniting said bracket structure with a member disposed generally parallel to the axis of rotation of said front gangs, said connecting means affording relative vertical movement of said bracket and gangs in relation to said member, and a draft pole attached to said member and extending forwardly therefrom.

6. In a disk harrow, a plurality of rigid frame structures having disk gangs rotatably mounted thereon, said frames being arranged in end opposed relation with one another and being hingedly connected to permit relative vertical movement about a horizontal axis generally normal to the axis of rotation of said disk gangs, a draft means comprising a head block positioned on the forward portion of each of said frames, means hingedly connected with said head block for relative movement about a horizontal hinge axis generally parallel to the axis of rotation of said disk gangs and including as parts thereof a forwardly projecting part mounted in a manner affording a swivel-like movement of said projecting part about a horizontal axis generally normal to said horizontal hinge axis, a bar structure disposed generally parallel to said frames and operatively connected to the forwardly projecting part on each of said connecting means, a bracket adjustably positioned on said bar, and a single draft pole carried by said bracket and extending forwardly therefrom.

7. In a disk harrow, a plurality of rigid frame structures having disk gangs rotatably mounted thereon, said frames being arranged in end opposed relation with respect to another and being hingedly connected to permit relative vertical movement about a horizontal axis generally normal to the axis of rotation of said disk gangs, a draft means comprising a head block attached to the forward portion of each of said frames, a member arranged in a position generally parallel to the axis of rotation of said disk gangs, means connecting each of said head blocks with said member in a manner affording relative pivotal movement therebetween about a horizontal axis generally normal to the axis of rotation of said disk gangs, said connecting means and member also including parts affording relative lateral movement between said head blocks and along said member, and a draft pole carried by said member and extending forwardly therefrom.

8. In a disk harrow, a plurality of rigid frame structures having disk gangs rotatably mounted thereon, said frames being arranged in end opposed relation with respect to one another and being hingedly connected to permit relative vertical movement about a horizontal axis generally normal to the axis of rotation of said disk gangs, a draft means comprising a head block attached to the forward portion of each of said frames, a bar member disposed in generally parallel relation to the axis of rotation of said disk gangs, means connecting each of said head blocks with said bar member in a manner affording relative pivotal movement therebetween about a horizontal axis generally normal to a vertical plane through the axis of rotation of said disk gangs, said connecting means and member also including parts affording relative lateral movement of said head blocks with respect to one another, and a draft pole carried by said bar member and extending forwardly therefrom.

9. In a disc harrow, a pair of rigid frame structures each having a series of axially aligned discs rotatably mounted thereon, said frames being arranged in end opposed relation with one another and being hingedly connected at their relatively adjacent ends to permit relative vertical movement about a horizontal axis generally normal to the axes of rotation of said discs, a draft pole adapted for hitching at its forward end to a draft vehicle, an evener bar, connecting means between said evener bar and said draft pole at the rear end of the latter including relatively engageable and disengageable fastening elements permitting attachment of said draft pole to said evener bar in different positions of adjustment lengthwise of said evener bar and in different positions of angular adjustment of said draft pole relative to a plane extending at right angles to said evener bar, and flexible coupling means at opposite ends, respectively, of said evener bar connecting the latter in angularly movable, draft transmitting relation with said frame structures so as to accommodate said vertical swinging movement of the latter relative to each other while maintaining said evener bar in substantially parallel relation to the axes of rotation of said discs.

10. In a disc harrow, a pair of rigid frame structures each having a series of axially aligned discs rotatably mounted thereon, said frames being arranged in end opposed relation with one another and being hingedly connected at their relatively adjacent ends to permit relative vertical movement about a horizontal axis generally normal to the axes of rotation of said discs, a pair of coupling structures pivotally connected, respectively, with said frame structures for up and down swinging movement relative thereto about an axis generally parallel to the axes of rotation of said discs, an evener bar connected at its opposite ends, respectively, with said coupling structures in draft transmitting, angularly movable and endwise shiftable relation to said coupling structures and supported by the latter so as to extend transversely of said horizontal axis on which said frame structures are connected with each other, a bracket adjustably positioned on said evener bar for adjustment longitudinally thereof, and a draft pole connected to said bracket and extending forwardly thereof for angular adjustment relative to said evener bar.

KENNETH E. JONES.

REFERENCES CITED

The following references are of record in the file of this patent:

UNITED STATES PATENTS

| Number | Name | Date |
|---|---|---|
| 1,329,118 | Fronczak | Jan. 27, 1920 |
| 1,921,480 | Ray | Aug. 8, 1933 |
| 2,149,347 | Austin | May 23, 1939 |
| 2,166,678 | Brenneis et al. | July 18, 1939 |
| 2,303,320 | Benjamin et al. | Dec. 1, 1942 |
| 2,341,139 | Dyrr | Feb. 8, 1944 |
| 2,349,852 | Dyrr | May 30, 1944 |
| 2,402,884 | Gier | June 25, 1946 |